United States Patent [19]
Levine

[11] 3,718,508
[45] Feb. 27, 1973

[54] DEFERRED-ACTION BATTERY COMPRISING A PERFORATED AMPOULE SEALED WITH REMOVABLE PLUGS

[76] Inventor: Seymour Levine, 26 Clarendon Terrace, Dover, N.J. 07801

[22] Filed: Aug. 30, 1971

[21] Appl. No.: 175,847

[52] U.S. Cl..................................136/90, 136/113
[51] Int. Cl..............................................H01m 21/00
[58] Field of Search....................136/112–114, 90, 136/160, 162–163; 137/260; 141/302; 222/389

[56] References Cited

UNITED STATES PATENTS

| | | |
|---|---|---|
| 2,918,517 | 12/1959 | Everett....................................136/90 |
| 3,211,588 | 10/1965 | Marsal.....................................136/90 |
| 3,507,707 | 4/1970 | Biggar......................................136/90 |
| 3,585,080 | 6/1971 | Morganstein............................136/90 |

*Primary Examiner*—Anthony Skapars
*Attorney*—Harry M. Saragovitz et al.

[57] ABSTRACT

This invention relates to an automatically activated delay action battery, containing an electrolyte, sealed in an ampoule of novel design. This novel ampoule comprises a perforated container whose perforations are sealed with removable plugs, and a slidably mounted sleeve with misaligned holes over the container restraining the plugs. Set-back force slides the sleeve to align the holes with the perforations and centrifugal force causes the electrolyte to dislodge the plugs and flow into contact with the plates to activate the battery.

4 Claims, 3 Drawing Figures

3,718,508

PATENTED FEB 27 1973

INVENTOR
SEYMOUR LEVINE
BY

DEFERRED-ACTION BATTERY COMPRISING A PERFORATED AMPOULE SEALED WITH REMOVABLE PLUGS

The invention described herein may be manufactured, used and licensed by or for the Government for governmental purposes without the payment to me of any royalty thereon.

BACKGROUND OF THE INVENTION

This invention relates to a deferred-action battery that is activated by the introduction of electrolyte into the cell plates at a predetermined time. Automatically activated batteries, which this invention is suitable for, are primarily used in electrically controlled fuzing systems in artillery projectiles.

Such batteries have become objects of increasing interest as a power source of electrical energy transmitted automatically upon activation. In fact, they are indispensable to a modern arsenal of projectiles.

Difficulty encountered with prior deferred-action batteries is that frangible ampoules are often accidentally broken by ordinary handling, transport or storage. In addition, such batteries malfunction due to internal deterioration or damage to the ampoule or the electrodes. Another objection to former devices is that uniform distribution of electrolyte to the cell plates is often not achieved thereby causing erratic voltage and current outputs and duds.

A principal object of this invention is to develop a battery which is activated only when subjected to the proper level of G's and spin forces.

Another object is to provide a battery to withstand shock occasioned by handling or transport.

A further object is to insure a battery with a long shelf life, under adverse conditions without deterioration.

A still further object is to achieve uniform distribution of the electrolyte to all of the cell plates in the battery.

It is still another object to insure that the electrical circuit remains unenergized until the projectile has been launched.

Other objects and advantages of the invention will be apparent from the following description taken in connection with the accompanying drawings which form a part hereof.

SUMMARY OF THE INVENTION

It has now been found that the foregoing objectives can be obtained by a novel and unique ampoule for wet electrolyte as hereafter described.

More specifically, the invention relates to a novel unbreakable ampoule containing electrolyte mounted so that the cell plates are kept out of contact with the electrolyte until use of the battery is required. When it is desired to activate the battery, the ampoule permits the electrolyte to contact the surrounding cell plates. This retentive feature of the battery which postpones activation makes possible a long shelf life and provides for a more flexible storage capability. In addition, activation is achieved rapidly, completely, with safety and certainty with the cell plates that are located on the sides of the battery. The battery can be hermetically sealed or may be in communication with the atmosphere by means of conventional vents.

The subject invention fulfills the needs of the art, as described above, by providing a deferred-action battery especially adapted for use in munitions. The novel ampoule assembly consists of three principal members, to wit, an ampoule receptacle, a movable ampoule sleeve and a bellows. The bellows functions to alleviate pressure changes exerted on the electrolyte produced by varying altitudes and/or temperature changes.

BRIEF DESCRIPTION OF THE DRAWINGS

One embodiment of such battery assembly is shown in the accompanying drawings in which.

Figures 1, 3:
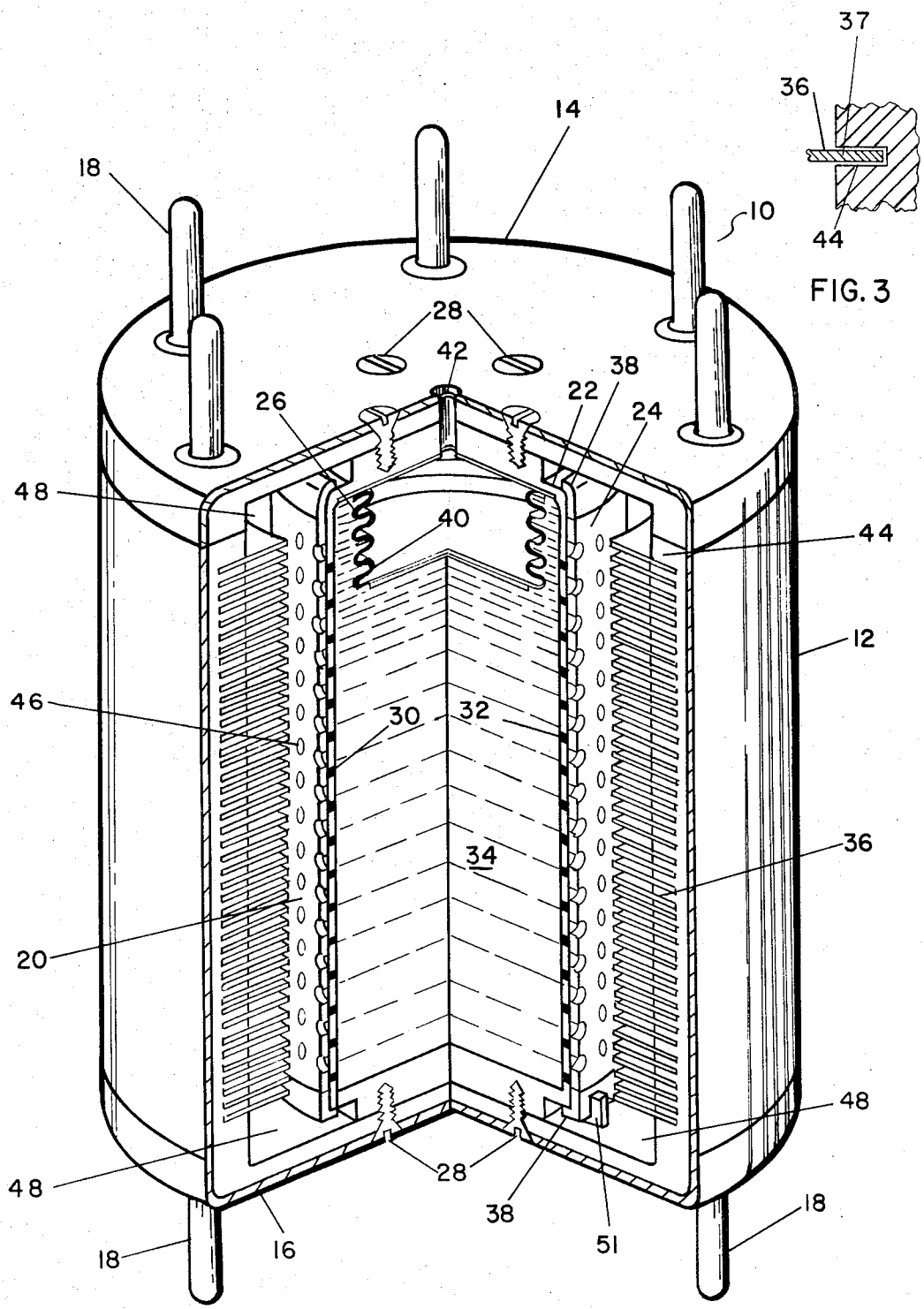
FIG. 1 is a partial cross-sectional view of the battery before activation.
FIG. 3 is an enlarged sectional view of a typical cell plate.

Referring to the drawings, the internal structure of the battery before it is activated is shown in FIG. 1. The casing 10 is made of a suitable structural material, having a side wall 12, a top cover 14 and bottom cover 16 which closes the ends of the casing 10. Electrical terminals 18 are provided which protrude through and are insulated from both the top cover 14 and bottom cover 16. The ampoule assembly 20 consists of three members, an ampoule receptacle 22, a movable ampoule sleeve 24 and bellows 26. The ampoule receptacle 22 is secured and appended to the top cover 14 and bottom cover 16 by means of screws 28 and has a common longitudinal axis with the casing. The ampoule receptacle 22 which is constructed of a material that is compatible with the corrosive electrolyte 34, contained therein and capable of maintaining its structural integrity when subjected to the forces to be experienced when placed in use. When the device is not in use the electrolyte is retained in the interior of the ampoule receptacle 22 and isolated from the cell plates 36 by the ampoule receptacle 22. This barrier not only completely surrounds the electrolyte 34 and protects the cell plates 36 from chemical action but also prevents the deterioration of the electrolyte 34. The ampoule receptacle 22 consists of an unbreakable rigid case having a perforated side wall and imperforated ends. The perforations 30 around the circumference of the ampoule receptacle 22 are sealed with a silicone polymer, or other material which would act as a plug and not be affected by the chemical effect of the electrolyte. These form knock-out plugs 32 which isolate the electrolyte 34 in the receptacle 22 until it is ready for use. The knock-out plugs 32 are integrally molded into the perforations 30 and are flush with the wall surface of the ampoule receptacle 22 thereby permitting unrestrictive movement of the ampoule sleeve 24 thereon.

In this embodiment the perforated protective ampoule sleeve 24 completely shields the perforated circumference of the ampoule receptacle 22; the ampoule sleeve 24 has an annular flexible flange 38 at both ends. These flanges will hold the sleeve 24 in position during normal handling but will deform under G setback environments of launch and permit the sleeve 24 to slide and align the orifices 46 in the sleeve 24 with the orifices 30 in the ampoule receptacle 22. Stop 51 in keyway 52 precludes the sleeve 24 from rotating under angular acceleration forces of launch. The ampoule sleeve 24 forms a cover for the ampoule receptacle 22 in which orifices 30 serve as a path for the passage of electrolyte 34 onto the cell plates 36. The sleeve 24, which is slidably mounted on the ampoule receptacle 22, has perforations 46 around its circumference which are out of line with the sealed perforations 30 of the ampoule receptacle 22. The ampoule sleeve 24 is preferably made of suitable inert insulating material having good tensile strength and a low coefficient of friction, such as NYLON. At the upper end of the ampoule receptacle 22 is a corrosive resistant bellows 40 having an outlet 42 to the atmosphere extending from the top of the bellows 40 and projecting through the top cover 14. Outlet 42 permits the bellows 40 to expand and contract and compensate for temperature and pressure variations in the ampoule receptacle 22. The ampoule assembly 20 is surround by a plurality of parallel cell plates 36 mounted radially with respect to the ampoule assembly 20 in side wall 12 of casing 10 and projecting into annular chamber 48 between ampoule assembly 20 and side wall 12. The number of cell plates 36 depends on the desired voltage and current to be produced at the terminals 18. The side wall 12 of casing 10 in provided with a plurality of radially disposed recesses 44 as shown in FIG. 3 which are adapted to retain the cell plates 36. The cell plate ends 37 are firmly embedded in the supporting structure recesses 44 to assure a strong and rigid battery. Within suitable limits any cell plate material and electrolyte may be provided without in any way affecting the details of the invention.

Figure 2:
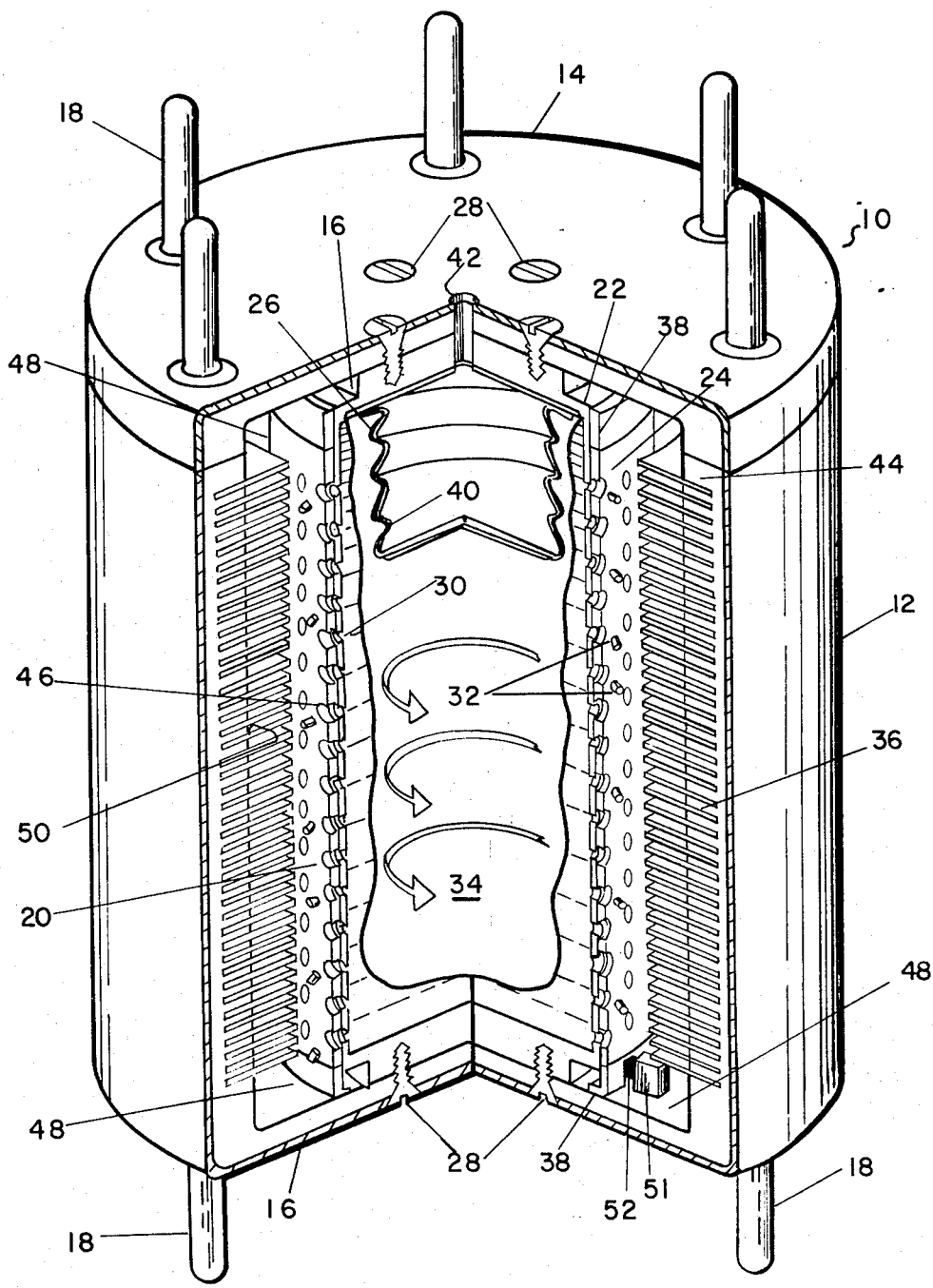
FIG. 2 is a partial cross-sectional view of the battery after activation.

This invention is designed for use in an electrically detonated projectile and is mounted therein with its longitudinal axis concentric with the axis of the projectile and with either end in the direction of projectile flight. In operation, as seen in FIG. 2, the battery is activated by the forces of setback. The energy of spin is utilized to supply the distribution of the electrolyte which in turn will activate the battery to supply required voltage for electrically activating the projectile.

A suitable amount of appropriate electrolyte 34 is initially confined within the sealed, unbreakable ampoule assembly 20 wherein the electrolyte is maintained out of contact with the cell plates 36, but is readily and freely accessible to said cell plates when the ampoule sleeve 24 is activated by the force of setback. When a projectile containing the battery of the present invention is fired from a gun, the ampoule assembly 20 is subject to the force of setback, which causes the ampoule sleeve 24 to move backward in the direction of the base plate 16 until the upper flange 38 strikes the base plate 16. The base plate 16 provides a stop surface for the ampoule sleeve 24 in order to properly align the orifices 30 of the ampoule receptacle 22 and distribution ducts 46 of the ampoule sleeve 24. This movement permits the plugs 32 to react to the spin forces which exert pressure on said plugs and force them to dislodge from respective openings, thereby releasing the electrolyte 34 solution to flow through the distribution ducts 46 to the surrounding cell plates 36. The centrifugal force of the spinning projectile is thus utilized to uniformly distribute the electrolyte 34 away from the longitudinal axis of the battery to contact the cell plates 36, thereby initiating generation of electrical current. The only path by which the electrolyte 34 can be fed to the individual cell plates 36 is through the distribution ducts 46 and orifices 30 provided in the ampoule assembly 20. The size of the orifices 30 and ducts 46 may be varied to control the volume and rate of flow of the electrolyte 34. The diameter to length ratio of the orifices 30 will also control the spin force required to force the plugs 32 form the orifice 30 depends on the size of nature of the plug. Thus the electrolyte 34 is thrown directly and forcefully in contact with all of the surrounding cell plates 36 by centrifugal action thereby instantaneously activating the battery and enabling the detonation of the projectile. As the electrolyte 34 is introduced into the cell plate chamber 48 the air therein is compressed and forced through the distribution ducts 46 and orifices 30 out of said chamber 48 and into the ampoule assembly 20 thereby receiving the negative pressure. This results in a rapid achievement of the equilibrium in the level of electrolyte 34 in the chamber 48. It is desired to call attention to the fact that the volume of electrolyte will be predetermined so that after activation of the battery the amount of electrolyte in each cell unit will such that there will be no excess to cause electrical short circuits.

I wish it to be understood that I do not desire to be limited to the exact details of construction shown and described, for obvious modifications will occur to a person skilled in the art.

I claim:

1. A delay action battery adopted for use in spin stabilized projectiles comprising:
    a casing;
    a closed ampoule containing liquid electrolyte and axially mounted in said casing and having a perforated wall wherein said perforations are sealed with removable plugs;
    a plurality of cell plates mounted in a chamber between said ampoule and said casing; and
    a slidably mounted perforated sleeve over said ampoule wall restraining said removable plugs, said sleeve adopted to slide rearwardly by setback force of projectile to align perforations in said sleeve and said ampoule wall, thereby permitting said electrolyte, by centrifugal force due to projectile spin to displace said removable plugs and flow into said chamber to activate the battery.

2. A delay action battery according to claim 1, wherein said casing and said ampoule are cylindrical in shape and said cell plates are annular plates fixed to said casing and extending into the annular chamber between said casing and said ampoule.

3. A delay action battery according to claim 1, wherein the ampoule contains a means responsive to expansion and contraction of said electrolyte to maintain substantially atmospheric pressure therein.

4. A delay action battery according to claim 3, wherein the means is a bellows immersed in and nonpermeable to said electrolyte and open to the atmosphere.

* * * * *